UNITED STATES PATENT OFFICE.

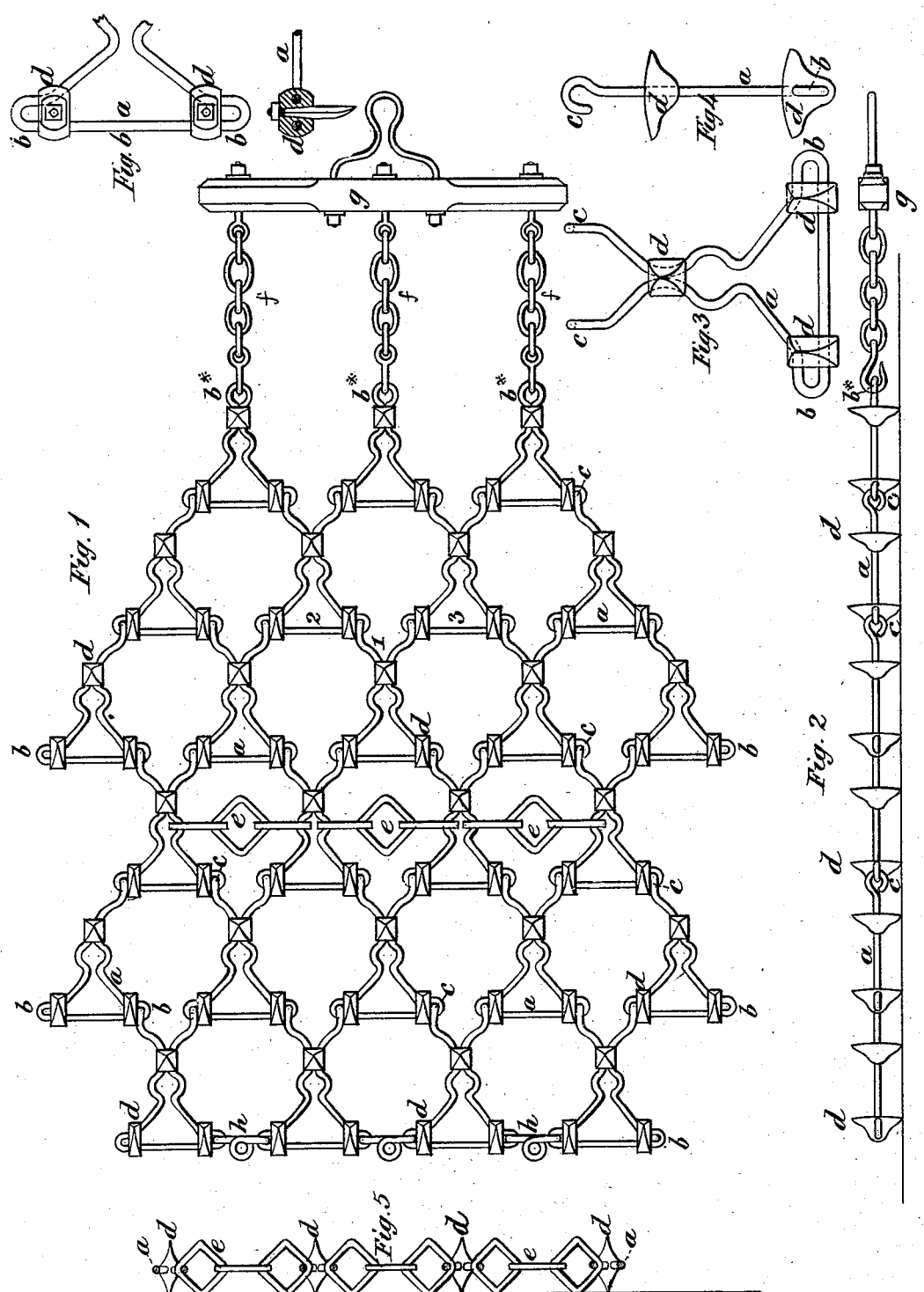

EDWARD T. BOUSFIELD, OF BEDFORD, ENGLAND.

IMPROVEMENT IN HARROWS.

Specification forming part of Letters Patent No. 189,181, dated April 3, 1877; application filed March 16, 1877.

*To all whom it may concern:*

Be it known that I, EDWARD TENNEY BOUS-FIELD, of Bedford, in the county of Bedford, England, engineer, have invented certain Improvements in Harrows, of which the following is a specification:

This invention relates to improvements on that class of harrows which are composed of tripod-frames, linked together and furnished with teeth or tines, the object being to improve their construction and increase their efficiency.

To this end I propose to make the tripod-frames which carry the tines from rods of wrought-iron or steel, bent so as to form suitable hooks and eyes for connecting the frames together. Upon these wrought frames the teeth or tines or sockets for the same are cast, so as to give rigidity to the frames.

Figure 1 shows in plan view, and Fig. 2 in side elevation, a harrow constructed according to this invention; and Figs. 3 and 4 are plan and edge views, on a larger scale, of one the frames of which the harrow is composed.

By reference to Fig. 3 it will be seen that $a$ is a round rod of iron or steel, from which the frame is constructed, it being first bent into a form somewhat resembling a link, to produce the eyes $b\,b$ at the opposite ends of the frame. From this link the opposite ends of the rod extend in a zigzag fashion, until they terminate in a pair of parallel hooks, $c\,c$. $d\,d$ are the tines, or it may be the tine-sockets, cast upon the bent rod that forms the tine-frame, in such position that, while placed at equal distances apart, they will insure to the frame the requisite rigidity.

In putting together frames thus prepared, the two hooks of each frame will enter the eyes of two adjacent frames, as shown at Fig. 1, where the hooks of the frame 1 enter, respectively, eyes in the frames 2 and 3, and so on, throughout the series of frames composing the harrow. It will thus appear that in the improved harrow no loose connecting-links are required to attach the separate frames together.

In the spaces formed by the connected frames I insert transverse rods or links, as shown at $e\,e$, Fig. 1, and in elevation in the cross-section at Fig. 5. By thus dividing up the spaces between the tripods I obtain additional acting-surfaces for the harrow.

The front ends of the foremost of the tripod-frames of the harrow terminate in eyes $b^*$, instead of hooks, in order to permit of their connection, through the chains $f$, with the draw-bar $g$, and the hindermost tripod-frames are connected together laterally by means of links $h\,h$, to give stiffness to the rear end of the harrow.

When the frames are furnished with tine-sockets I fit into these castings wrought-iron tines of the ordinary type, which are tapered toward their heads to insure a tight fit, and I secure the tines in place by means of screw-nuts. Fig. 6 illustrates this modification.

Having now described the nature of my invention, and explained the manner of carrying the same into effect, I wish it to be understood that I claim—

1. A flexible chain-harrow, composed of tripod-frames, made with eyes and hooks from rods of iron or steel, bent to shape, as shown at Figs. 3 and 4, and stiffened by tines or tine-sockets cast thereon, as above described.

2. In combination with tripod-frames, constituting a flexible or chain harrow, the links or acting-surfaces $e$, for dividing up the spaces between the tripods, as and for the purpose described.

Dated this 13th day of February, 1877.

EDWARD TENNEY BOUSFIELD.

Witnesses:
G. F. WARREN,
WILMER M. HARRIS,
*Both of No. 17 Gracechurch Street,*
*London, E. C.*